(12) United States Patent
Lee et al.

(10) Patent No.: US 8,139,684 B2
(45) Date of Patent: Mar. 20, 2012

(54) APPARATUS AND METHOD FOR PROCESSING MULTI-CHANNEL SIGNALS AND MULTI-CHANNEL RECEIVER USING THE SAME

(75) Inventors: Hwang Soo Lee, Daejeon (KR); Moohong Lee, Daejeon (KR); Jeong Han Jeong, Daejeon (KR); Byungjik Keum, Daejeon (KR); Young Serk Shim, Seoul (KR)

(73) Assignee: Korea Advanced Institute of Science & Technology, Daejeon (KR)

( * ) Notice: Subject to any disclaimer, the term of this patent is extended or adjusted under 35 U.S.C. 154(b) by 305 days.

(21) Appl. No.: 12/574,464

(22) Filed: Oct. 6, 2009

(65) Prior Publication Data
US 2011/0069787 A1 Mar. 24, 2011

(30) Foreign Application Priority Data
Sep. 24, 2009 (KR) ........................ 10-2009-0090514

(51) Int. Cl.
*H03D 3/00* (2006.01)
*H03K 9/06* (2006.01)
(52) U.S. Cl. ..................... 375/322; 375/340; 375/346
(58) Field of Classification Search .................. 375/322, 375/316, 344; 455/150.1, 149
See application file for complete search history.

(56) References Cited

U.S. PATENT DOCUMENTS

| | | | | |
|---|---|---|---|---|
| 4,694,490 A * | 9/1987 | Harvey et al. | ............. | 380/234 |
| 7,725,088 B2 * | 5/2010 | Cha et al. | .............. | 455/183.1 |
| 7,924,944 B2 * | 4/2011 | Vassiliou et al. | .......... | 375/316 |
| 7,974,254 B2 * | 7/2011 | Vare et al. | ................. | 370/342 |
| 7,978,774 B2 * | 7/2011 | Feher | ........................ | 375/260 |
| 8,014,446 B2 * | 9/2011 | Shah et al. | ............. | 375/240.01 |

* cited by examiner

*Primary Examiner* — Kenneth Lam
*Assistant Examiner* — Qutbuddin Ghulamali
(74) *Attorney, Agent, or Firm* — Harry K. Ahn; Abelman Frayne & Schwab

(57) ABSTRACT

Disclosed is a multi-channel signal receiver technology. An RF front-end in an RF receiver receiving at least two RF signals with different transmission bandwidths includes: at least two RF tuners receiving, amplifying, and frequency-converting the at least two RF signals, respectively; a switch selecting one of signals output from the at least two RF tuners; a channel filter eliminating interference signals included in a signal output from the switch, and passing a signal of a transmission band; an ADC converting the signal output from the channel filter into a digital signal; a fixed sampling frequency generator generating and transferring a fixed sampling frequency to the ADC.
In the RF front-end, by processing filtering and sampling of signals with a narrow transmission bandwidth through a residual calculation capacity of a digital processor a construction of an RF front-end may be simplified and manufacturing costs may be reduced.

6 Claims, 6 Drawing Sheets

APPARATUS AND METHOD FOR PROCESSING MULTI-CHANNEL SIGNALS AND MULTI-CHANNEL RECEIVER USING THE SAME

CROSS-REFERENCE TO RELATED APPLICATION

This application claims priority to Korean Patent Application No. 10-2009-0090514, filed on Sep. 24, 2009, and all the benefits accruing therefrom under 35 U.S.C. §119, the contents of which in its entirety are herein incorporated by reference.

BACKGROUND OF THE INVENTION

1. Field of the Invention

The present invention relates to a multi-channel signal receiver and multi-channel signal processing technology.

2. Description of the Related Art

In a case of a receiver in a multi-channel broadcasting system selectively receiving broadcasting signals with two different transmission bandwidths such as a Terrestrial digital multimedia broadcasting (T-DMB) signal and a Terrestrial Integrated Services Digital Broadcasting (ISDB-T) signal using one digital processor, there is a need to selectively process only desired signals.

FIG. 1 is a block diagram illustrating a conventional dual channel broadcasting receiver 1200 that simultaneously receives a T-DMB signal and an ISDB-T signal.

A radio frequency (RF) front-end 1000 is constructed by a first RF tuner 1020 receiving the T-DMB signal and a second RF tuner 1030 receiving the ISDB-T signal. The magnitude of the T-DMB signal received through a first antenna 1014 is amplified by a first low-noise amplifier 1001 and noise generated in the amplification process is reduced thereby. The center frequency of the T-DMB signal is generated by a first frequency generator 1005, and the generated center frequency thereof is transferred to a first frequency mixer 1002. The first frequency mixer 1002 receives the T-DMB signal and the center frequency thereof, and lowers the frequency of the T-DMB signal to an intermediate frequency band. The T-DMB signal with the intermediate frequency band is amplified by a first gain amplifier 1003 in magnitude, and the amplified T-DMB signal is transferred to a first channel filter 1004. The first channel filter 1004 eliminates interference signals included in the amplified T-DMB signal from the first gain amplifier 1003, and transfers a signal of a transmission band to a switch 1011.

The magnitude of the ISDB-T signal received through a second antenna 1015 is amplified, and noise generated in the amplification process is reduced by a second low-noise amplifier 1006. The center frequency of the ISDB-T signal is generated by a second frequency generator 1010, and the generated center frequency thereof is transferred to a second frequency mixer 1007. The second frequency mixer 1007 receives the ISDB-T signal and the center frequency thereof, and lowers the frequency of the ISDB-T signal to an intermediate frequency band. The ISDB-T signal of the intermediate frequency band is amplified by a second gain amplifier 1008 in magnitude, and the amplified ISDB-T signal is transferred to a second channel filter 1009. The second channel filter 1009 eliminates interference signals included in the amplified ISDB-T signal from the second gain amplifier 1008, and transfers a signal of a transmission band to the switch 1011.

A reason why two RF tuners 1020 and 1030 are required for the dual channel broadcasting receiver 1200 is because transmission bandwidths of respective channel broadcasting signals differ from each other. For example, in a case of the T-DMB signal, signals of a very high frequency (VHF) band are used and a transmission bandwidth thereof is 2.048 MHz. Meanwhile, in a case of the ISDB-T one-seg signal, signals of an ultra high frequency (UHF) band are used and a transmission bandwidth thereof is 0.43 MHz.

The dual channel broadcasting receiver 1200 transfers one of the T-DMB signal and the ISDB-T signal received through the switch 1011 to an analog to digital converter (ADC) 1012 as an input thereof. A controller 1105 of a digital processor 1100 control a variable sampling frequency generator 1013 to generate a sampling frequency based on a transmission bandwidth of the signal transferred to the ADC 1021. In this case, the sampling frequency based on a transmission bandwidth of each signal is not a specific unique value. Namely, in a Nyquist's sampling theorem, the sampling frequency may be greater than at least twice a transmission bandwidth of a signal to be sampled. The received signal converted into a digital signal by the ADC 1012 is stored in a buffer 1101 of the digital processor 1100, and is divided into in-phase components and quadrature-phase components through an I/Q demodulator 1102. A synchronizing block 1103 transfers a control signal for adjusting time and frequency synchronization of an input signal to a data decoding block 1104. The decoding block 1104 receives the control signal from the synchronizing block 1103 and an output of the I/Q demodulator 1102, adjusts time and frequency synchronization of the received signal, and decodes the received signal. The controller 1105 sets parameters required to receive the T-DMB and ISDB-T signals with different transmission bandwidths in the dual channel broadcasting receiver 1200 and to perform a series of the foregoing procedures, and controls respective function blocks 1011, 1013, 1103, and 1104.

Since transmission bandwidths of the respective signals differ from each other, upon sampling the signals at a digital signal, a sampling frequency should change. Accordingly, a variable sampling frequency generator 1013 is used as a frequency generator of the RF front-end 1000 so that a sampling frequency can change according to respective signals. This complicates the construction of the RF front-end and increases manufacturing costs.

SUMMARY OF THE INVENTION

The present invention has been made in view of the above problems, and it is an object of the present invention to simplify a construction of an RF front-end and to reduce manufacturing costs by processing filtering and sampling of signals with a narrow transmission bandwidth among received multi-channel signals through a residual calculation capacity of a digital processor not the RF front-end.

In accordance with an exemplary embodiment of the present invention, there is provided a radio frequency (RF) front-end in an RF receiver receiving at least two RF signals with different transmission bandwidths, the RF front-end receiving the RF signals and sampling the received RF signals with a digital signal, comprising: at least two RF tuners receiving, amplifying, and frequency-converting the at least two RF signals, respectively; a switch selecting one of signals output from the at least two RF tuners; a channel filter eliminating interference signals included in a signal output from the switch, and passing a signal of a transmission band; an analog to digital converter converting the signal output from the channel filter into a digital signal; a fixed sampling frequency generator generating and transferring a fixed sampling frequency to the analog to digital converter, each of the RF tuners includes: an antenna receiving the RF signal; a low-noise amplifier amplifying the received RF signal and reducing noise generated in the amplification process; a frequency mixer converting the amplified signal output from the low-noise amplifier into an intermediate frequency band; a frequency generator generating a frequency signal for converting the amplified RF signal output from the low-noise amplifier into an intermediate frequency band, and providing the generated frequency signal to the frequency mixer; and a gain amplifier amplifying an output signal of the frequency mixer, wherein the channel filter filters the output signal of the switch based on a transmission bandwidth of a signal with the widest transmission bandwidth among the at least two RF signals, and the fixed sampling frequency generator generates the fixed sampling frequency based on the transmission bandwidth of the signal with the widest transmission bandwidth among the at least two RF signals.

Preferably, the RF receiver receives two RF signals with different transmission bandwidths, the two RF signals are a terrestrial digital multimedia broadcasting (T-DMB) signal and a terrestrial integrated services digital broadcasting (ISDB-T) signal, and the channel filter filters the output signal of the switch based on a transmission bandwidth of the T-DMB signal with a wide transmission bandwidth, and the fixed sampling frequency generator generates the fixed sampling frequency based on the transmission bandwidth of the T-DMB signal.

There is provided a digital processor in an RF receiver receiving at least two RF signals with different transmission bandwidths, the digital processor demodulating a digital signal output from an RF front-end receiving the RF signals and sampling the received RF signals with the digital signal, comprising: a buffer storing the digital signal output from the RF front-end; a switch controlling a path of the digital signal output from the buffer according to the size of a transmission bandwidth of the digital signal; a channel filter eliminating interference signals included in the output signal of the switch, and passing a signal of a transmission band; a sampling rate converter converting a sampling frequency of an output signal of the channel filter; an I/Q demodulator dividing a signal output from the sampling rate converter into an in-phase component and a quadrature-phase component; a synchronizing block transferring a control signal for adjusting time and frequency synchronization of an input signal to a data decoding block; a decoding block receiving the control signal from the synchronizing block and an output of the I/Q demodulator, adjusting time and frequency synchronization of the received signal, and decoding the received signal; a controller controlling the switch, the channel filter, the sampling rate converter, the I/Q demodulator, the synchronizing block, and the data decoding block, wherein the switch transfers the signal to the I/Q demodulator without passing through the channel filter and the sampling rate converter when the signal output from the buffer has a transmission bandwidth wider than a transmission bandwidth set by the controller, and the switch transfers the digital signal output from the buffer to the channel filter when the signal output from the buffer has a transmission bandwidth narrower than the transmission bandwidth set by the controller; and the channel filter filters the output signal of the switch based on a transmission bandwidth of the output signal, and the sampling rate converter converts a sampling frequency of the signal output from the channel filter into a sampling frequency based on the transmission bandwidth of the output signal of the channel filter.

Preferably, the RF receiver receives two RF signals with different transmission bandwidths, the two RF signals are a terrestrial digital multimedia broadcasting (T-DMB) signal and a terrestrial integrated services digital broadcasting (ISDB-T) signal; the switch transfers the T-DMB signal to the I/Q demodulator without passing through the channel filter and the sampling rate converter when the digital signal output from the buffer is the T-DMB signal, and the switch transfers the ISDB-T signal to the channel filter when the digital signal output from the buffer is the ISDB-T signal; and the channel filter filters the output signal of the switch based on a transmission bandwidth of the ISDB-T signal, and the sampling rate converter converts a sampling frequency of the ISDB-T signal output from the channel filter based on a transmission bandwidth of the output ISDB-T signal.

There is provided an RF receiver receiving at least two RF signals with different transmission bandwidths, comprising: an RF front-end receiving the RF signals and sampling the received RF signals with a digital signal; and a digital processor demodulating the digital signal output from an RF front-end, wherein the RF front-end includes: at least two RF tuners receiving, amplifying, and frequency-converting the at least two RF signals, respectively; a first switch selecting one of signals output from the at least two RF tuners; a first channel filter eliminating interference signals included in a signal output from the first switch, and passing a signal of a transmission band; an analog to digital converter converting the signal output from the channel filter into a digital signal; a fixed sampling frequency generator generating and transferring a fixed sampling frequency to the analog to digital converter, each of the RF tuners includes: an antenna receiving the RF signal; a low-noise amplifier amplifying the received RF signal and reducing noise generated in the amplification process; a frequency mixer converting the amplified signal output from the low-noise amplifier into an intermediate frequency band; a frequency generator generating a frequency signal for converting the amplified RF signal output from the low-noise amplifier into an intermediate frequency band, and providing the generated frequency signal to the frequency mixer; and a gain amplifier amplifying an output signal of the frequency mixer, wherein the first channel filter filters the output signal of the switch based on a transmission bandwidth of a signal with the widest transmission bandwidth among the at least two RF signals, and the fixed sampling frequency generator generates the fixed sampling frequency based on the transmission bandwidth of the signal with the widest transmission bandwidth among the at least two RF signals, and the digital processor includes: a buffer storing the digital signal output from the RF front-end; a second switch controlling a path of the digital signal output from the buffer according to the size of a transmission bandwidth of the digital signal; a second channel filter eliminating interference signals included in the output signal of the second switch, and passing a signal of a transmission band; a sampling rate converter converting a sampling frequency of an output signal of the channel filter; an I/Q demodulator dividing a signal output from the sampling rate converter into an in-phase component and a quadrature-phase component; a synchronizing block transferring a control signal for adjusting time and frequency synchronization of an input signal to a data decoding block; a decoding block receiving the control signal from the synchronizing block and an output of the I/Q demodulator, adjusting time and frequency synchronization of the received signal, and decoding the received signal; a controller controlling the switch, the channel filter, the sampling rate converter, the I/Q demodulator, the synchronizing block, and the data decoding block, wherein the second switch transfers the signal to the I/Q demodulator without passing through the second channel filter and the sampling rate converter when the signal output from the buffer has a transmission bandwidth wider than a transmission bandwidth set by the controller, and the second switch transfers the digital signal output from the buffer to the second channel filter when the signal output from the buffer has a transmission bandwidth narrower than the transmission bandwidth set by the controller; and the second channel filter filters the output signal of the second switch based on a transmission bandwidth of the output signal, and the sampling rate converter converts a sampling frequency of the signal output from the channel filter into a sampling frequency based on the transmission bandwidth of the output signal of the channel filter.

Preferably, the RF receiver receives two RF signals with different transmission bandwidths, the two RF signals are a terrestrial digital multimedia broadcasting (T-DMB) signal and a terrestrial integrated services digital broadcasting (ISDB-T) signal; the first channel filter filters the output signal of the switch based on a transmission bandwidth of the T-DMB signal with a wide transmission bandwidth, and the fixed sampling frequency generator generates the fixed sampling frequency based on the transmission bandwidth of the T-DMB signal; the second switch transfers the T-DMB signal to the I/Q demodulator without passing through the second channel filter and the sampling rate converter when the digital signal output from the buffer is the T-DMB signal, and the second switch transfers the ISDB-T signal to the second channel filter when the digital signal output from the buffer is the ISDB-T signal; and the second channel filter filters the output signal of the second switch based on a transmission bandwidth of the ISDB-T signal, and the sampling rate converter converts a sampling frequency of the ISDB-T signal output from the second channel filter based on a transmission bandwidth of the output ISDB-T signal.

There is provided a signal processing method using an RF receiver receiving at least two RF signals with different transmission bandwidths, comprising the steps of: (i) receiving the at least two RF signals with different transmission bandwidths by an RF front-end; (ii) firstly filtering the received RF signals based on a transmission bandwidth of an RF signal having the widest transmission bandwidth among receivable signals by the RF front-end to generate a first filtered signal; (iii) sampling the first filtered signal with a first sampling frequency based on the transmission bandwidth of an RF signal having the widest transmission bandwidth among receivable signals by the RF front-end; (iv) secondly filtering the first filtered signal output from the RF front-end based on a transmission bandwidth of the first filtered signal by a digital processor connected to the RF front-end when the first filtered signal is not the RF signal with the widest transmission bandwidth; (v) converting a first sampling frequency of the second filtered signal into a second sampling frequency based on the transmission bandwidth of the second filtered signal by the digital processor; (vi) demodulating the second filtered signal converted into the second sampling frequency by the digital processor; and (vii) demodulating the first filtered signal by the digital process when the first filtered signal is the RF signal with the widest transmission bandwidth.

Preferably, step (i) receives two RF signals, the two RF signals are a T-DMB signal and an ISDB-T signal, step (ii) firstly filters the received RF signals based on a transmission bandwidth of the T-DMB signal, step (iii) samples the first filtered signal with the first sampling frequency based on the transmission bandwidth of the T-DMB signal, the first filtered signal of step (iv) is the ISDB-T signal, step (iv) secondly filters the first filtered signal based on a transmission bandwidth of the ISDB-T signal, step (v) converts the first sampling frequency of the second filtered signal into the second sampling frequency based on the transmission bandwidth of the ISDB-T signal, and the first filtered signal of step (vii) is the T-DMB signal.

In the present invention, by processing filtering and sampling of signals with a narrow transmission bandwidth among received multi-channel signals through a residual calculation capacity of a digital processor not the RF front-end, a construction of an RF front-end may be simplified and manufacturing costs may be reduced.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Hereinafter, an apparatus for processing multi-channel signals, a multi-channel receiver, and a method for processing multi-channel signals in accordance with an embodiment of the present invention are described in detail with reference to the accompanying drawings.

In order to provide a better understanding of the present invention, although a T-DMB signal and an ISDB-T signal are described by way of example only, the present invention is not limited thereto. The present invention is also applicable to all the digital signals. Further, the number of receivable signals is not limited to two. That is, more signals than two can be applied.

RF Front-End

Figure 2:
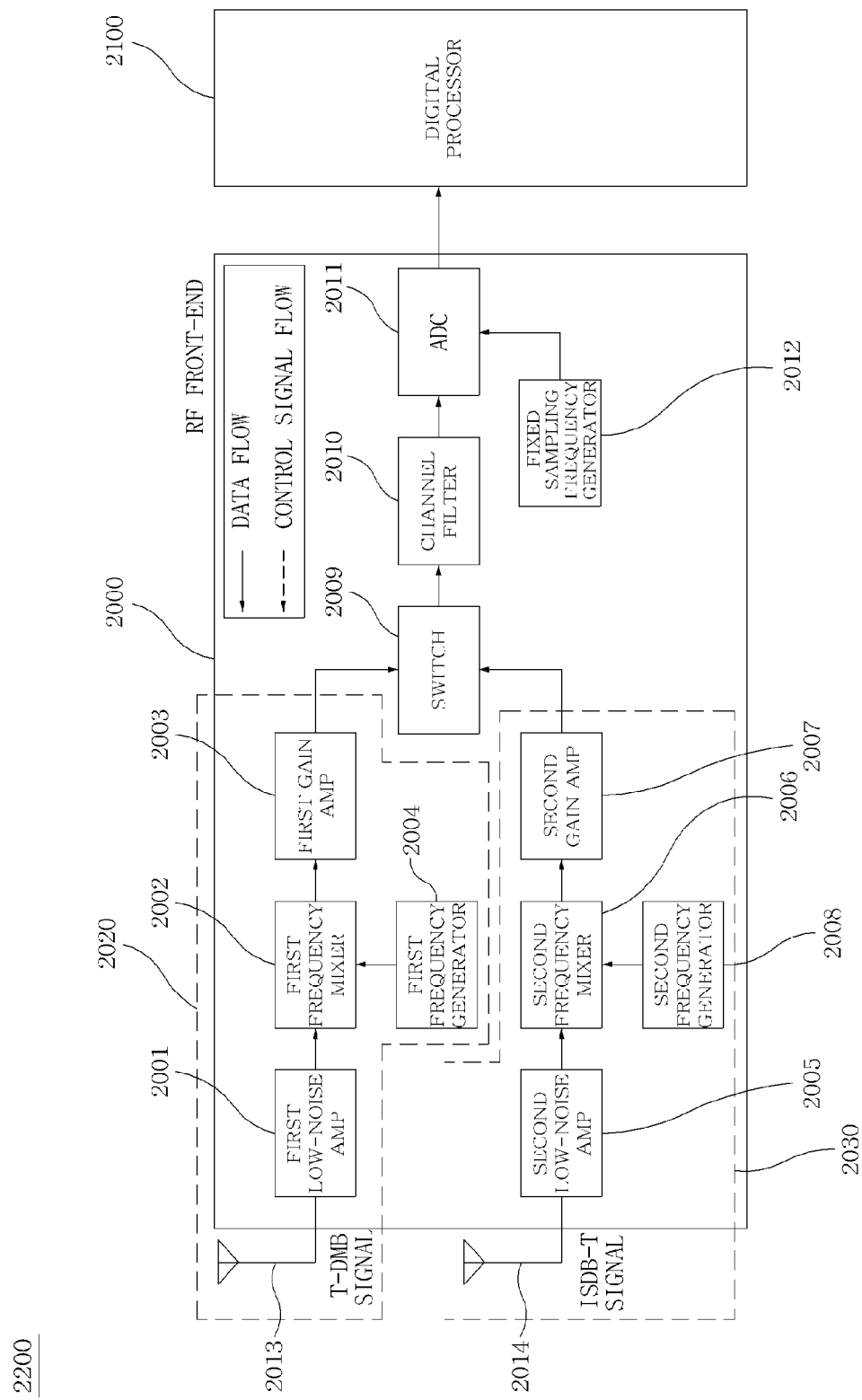
FIG. 2 is a block diagram illustrating an RF front-end of an RF receiver in accordance with an embodiment of the present invention.

FIG. 2 is a block diagram illustrating an RF front-end 2000 of an RF receiver 2200 in accordance with an embodiment of the present invention.

Referring to FIG. 2, the RF front-end 2000 according to the present invention is connected to a digital processor 2100. The RF front-end 2000 includes first and second RF tuners 2020 and 2030, a switch 2009, a channel filter 2010, an ADC 2011, and a fixed sampling frequency generator 2012.

The first RF tuner 2020 includes a first antenna 2013, a first low-noise amplifier 2001, a first frequency mixer 2002, a first frequency generator 2004, and a first gain amplifier 2003.

The first antenna 2013 receives a T-DMB signal. The first low-noise amplifier 2001 amplifies a magnitude of the received T-DMB signal, reduces noise generated in the amplification process, and transfers the amplified T-DMB signal to the first frequency mixer 2002. The first frequency mixer 2002 converts the amplified T-DMB signal output from the first low-noise amplifier 2001 into an intermediate frequency band, and transfers it to the first gain amplifier 2003. The first frequency generator 2004 generates a frequency signal to convert the amplified T-DMB signal output from the first low-noise amplifier 2001 into an intermediate frequency band, and provides the frequency signal to the first frequency mixer 2002. The gain amplifier 2003 amplifies a gain of an output signal of the first frequency mixer 2002, and transfers the amplified signal to the switch 2009.

The second RF tuner 2030 includes a second antenna 2014, a second low-noise amplifier 2005, a second frequency mixer 2006, a second frequency generator 2008, and a second gain amplifier 2007. Respective structural elements of the second RF tuner 2030 have substantially the same functions as those of the first RF tuner 2020.

The switch 2009 selects one of the T-DMB signal received by the first antenna 2013 and the ISDB-T signal received by the second antenna 2014, and transfers the selected one signal to the channel filter 2010.

The channel filter 2010 eliminates interference signals included in the output signal of the switch 2009, and passes and transfers a signal of a transmission band to the ADC 2011. The channel filter 2010 has a pass band according to a transmission bandwidth of a T-DMB signal with a wide transmission bandwidth.

The ADC 2011 converts the signal output from the channel filter 2010 into a digital signal, and transfers the digital signal to the digital processor 2100. A sampling frequency required in this procedure is generated by a fixed sampling frequency generator 2012, and is transferred to the ADC 2011.

Since the T-DMB signal and the ISDB-T signal being a conversion target have different transmission bandwidths, they need sampling frequencies based on their transmission bandwidths when respective signals are converted into a digital signal. However, the fixed sampling frequency generator 2012 of the present invention generates a sampling frequency based on a transmission bandwidth of the T-DMB signal with a wide transmission bandwidth regardless of what is a signal selected by the switch 2009, and transfers the generated sampling frequency to the ADC 2011.

Figure 1:
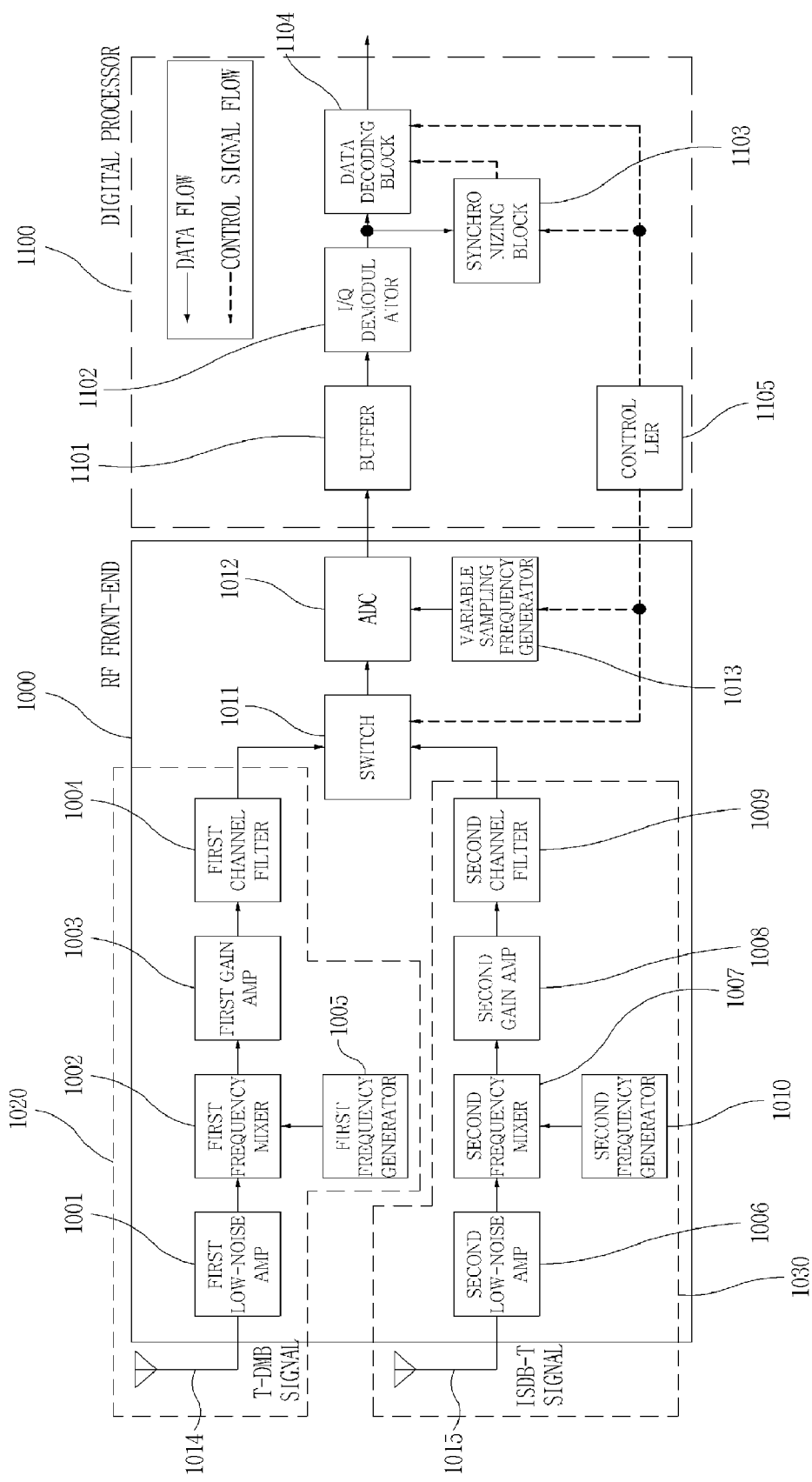
FIG. 1 is a block diagram illustrating a conventional dual channel broadcasting receiver simultaneously receiving a T-DMB signal and an ISDB-T signal.

In the conventional dual channel broadcasting receiver 1200 shown in FIG. 1, the RF front-end 1000 includes two channel filters 1004 and 1009. The channel filters 1004 and 1009 have different pass bands according to transmission bandwidths of received signals, respectively. Meanwhile, the RF front-end 2000 of the present invention includes one channel filter 2010. The channel filter 2010 has a pass band according to a transmission bandwidth of a T-DMB signal with a wide transmission bandwidth. When the signal selected by the switch 2009 is an ISDB-T signal, because a pass band of the channel filter 2010 is wider than a transmission bandwidth of the ISDB-T signal, there remain interference signals around the transmission bandwidth in the signal passed through the channel filter 2010.

Further, the RF front-end 1000 shown in FIG. 1 includes a variable sampling frequency generator 1013. In the meantime, the RF front-end 2000 of the present invention includes a fixed sampling frequency generator 2012. If the signal selected by the switch 2009 is an ISDB-T signal, the ISDB-T signal is sampled with the sampling frequency based on a transmission bandwidth of a T-DMB signal wider than that of the ISDB-T signal. Consequently, the quality of the signal sampled based on the transmission bandwidth of the T-DMB signal is lower as compared with that of the signal sampled with the sampling frequency based on the transmission bandwidth of the ISDB-T signal.

However, in one embodiment of the present invention, by performing filtering and sampling of the ISDB-T signal with a narrow transmission bandwidth through a residual calculation capacity of a digital processor 2100 not the RF front-end 2100, a construction of an RF front-end 2000 may be simplified and manufacturing costs may be reduced while maintaining performance of an RF receiver.

Digital Processor

Figure 3:
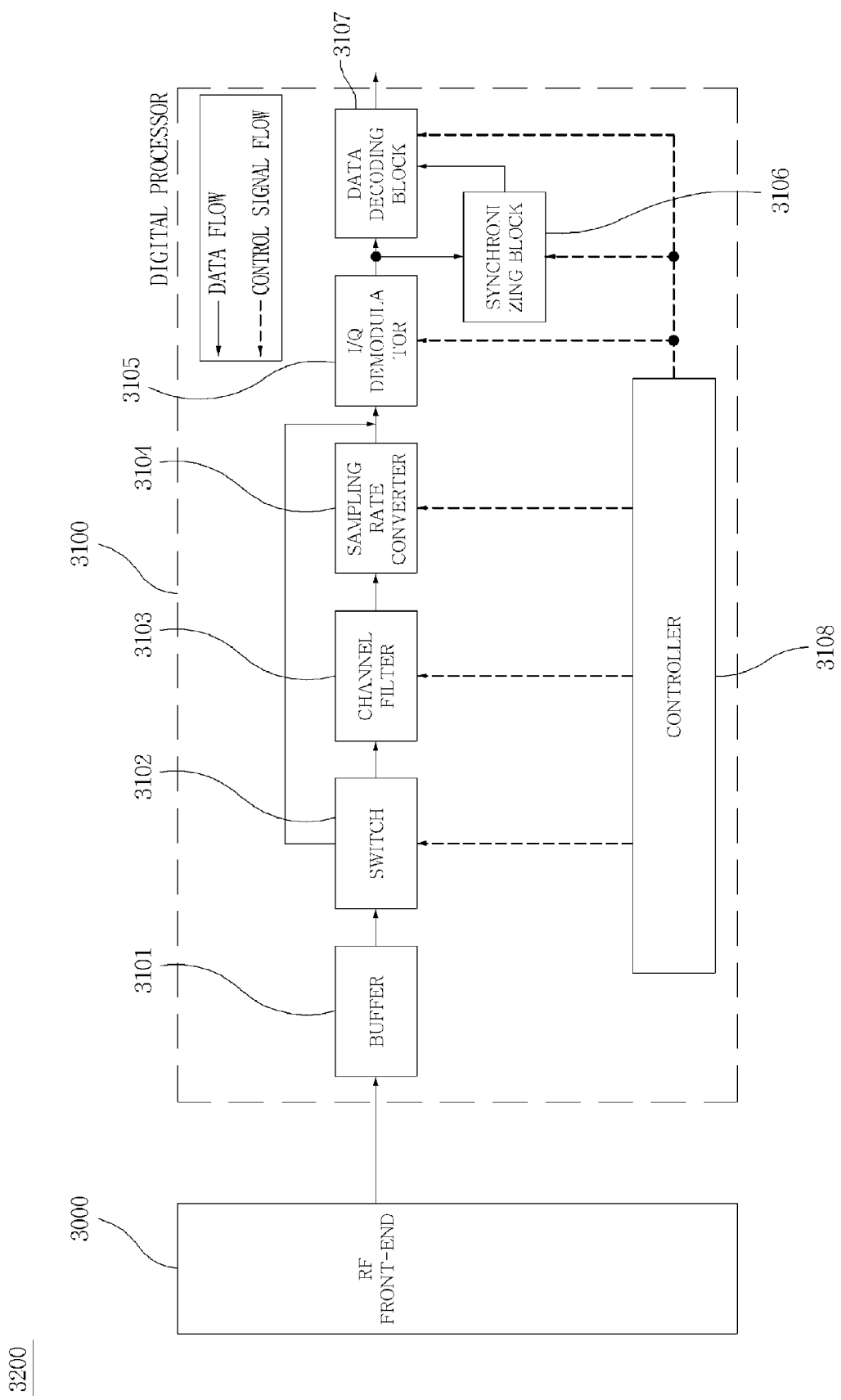
FIG. 3 is a block diagram illustrating a digital processor of an RF receiver in accordance with an embodiment of the present invention.

FIG. 3 is a block diagram illustrating a digital processor 3100 of an RF receiver 3200 in accordance with an embodiment of the present invention.

Referring to FIG. 3, the digital processor 3100 of the present invention is connected to an RF front-end 3000, and includes a buffer 3101, a switch 3102, a channel filter 3103, a sampling rate converter 3104, an I/Q demodulator 3105, a synchronizing block 3106, a data decoding block 3107, and a controller 3108.

The buffer 3101 stores and transfers the digital signal output from the RF front-end 3000 to the switch 3102.

The switch 3102 controls a path of a signal according to the size of a transmission bandwidth of the digital signal output from the buffer 3101. The path of the signal is determined by comparing the transmission bandwidth of the digital signal output from the buffer 3101 with a transmission bandwidth set by the controller 3108. In the embodiment shown in FIG. 3, the set transmission bandwidth becomes a transmission bandwidth of a T-DMB signal with a wide transmission bandwidth. Namely, when the signal output from the buffer 3101 is the T-DMB signal with a transmission bandwidth wider than that of the ISDB-T signal, the switch 3102 transfers the T-DMB signal to the I/Q demodulator 3105 without passing through the channel filter 3103 and the sampling rate converter 3104. On the contrary, when the output signal of the buffer 3101 is the ISDB-T signal, the switch 3102 transfers the ISDB-T signal to the channel filter 3103.

The channel filter 3103 is a software based filter included in the digital processor 3100. The channel filter 3103 eliminates interference signals included in the output signal of the switch 3102, and passes and transfers a signal of a transmission band to the sampling rate converter 3104.

Because a transmission bandwidth of the ISDB-signal is narrower than that of the T-DMB signal, although the ISDB-T signal passes through a channel filter of the RF front-end 3000, there remain interference signals around the transmission bandwidth of the ISDB-T signal. Accordingly, when the ISDB-T signal passes through the channel filter 3103 included in the digital processor 3100, in which a pass band of the channel filter 3103 is determined based on a transmission bandwidth of the ISDB-T signal, the interference signals remaining around the transmission bandwidth are eliminated.

Since the T-DMB signal previously passed through the channel filter 2010 based on its transmission bandwidth in the RF front-end 3000, it is unnecessary to pass the T-DMB signal through the channel filter 3103 of the digital processor 3100. Accordingly, when the signal input to the switch 3102 is the T-DMB signal, the switch 3102 controls a path of the T-DMB signal without passing through the channel filter 3103.

The sampling rate converter 3104 converts a sampling frequency of an output signal of the channel filter 3103 into a sampling frequency based on a transmission bandwidth of the ISDB-T signal, and transfers the signal with the converted sampling frequency to the I/Q demodulator 3105.

The I/Q demodulator 3105 receives one of the ISDB-T signal output from the sampling rate converter 3104 and the T-DMB signal output from the switch 3102 as an input, divides the received signal into an in-phase component and a quadrature-phase component, and transfers the in-phase component and the quadrature-phase component to the synchronizing block 3106 and the data decoding block 3107.

The synchronizing block 3106 receives the output signal of the I/Q demodulator 3105, and transfers a control signal for adjusting time and frequency synchronization of the received signal to the data decoding block 3107.

The data decoding block 3107 adjusts time and frequency synchronization of the signal from the I/Q demodulator 3105 according to the control signal from the synchronizing block 3106, and decodes the received signal.

The controller 3108 controls the switch 3102, the channel filter 3103, the sampling rate converter 3104, the I/Q demodulator 3105, the synchronizing block 3106, and the data decoding block 3107. That is, the controller 3108 sets parameters required to receive the two signals with different transmission bandwidths in the RF receiver and to perform a series of the foregoing procedures, and controls respective function blocks 3102, 3103, 3104, 3105, 3106, and 3107.

In one embodiment of the present invention, by performing filtering and sampling of an ISDB-T signal with a narrow transmission bandwidth through a residual calculation capacity of a digital processor 3100 not the RF front-end 3000, a construction of an RF front-end 3000 may be simplified and manufacturing costs may be reduced while maintaining performance of an RF receiver.

Multi-Channel Signal RF Receiver

Figure 4:
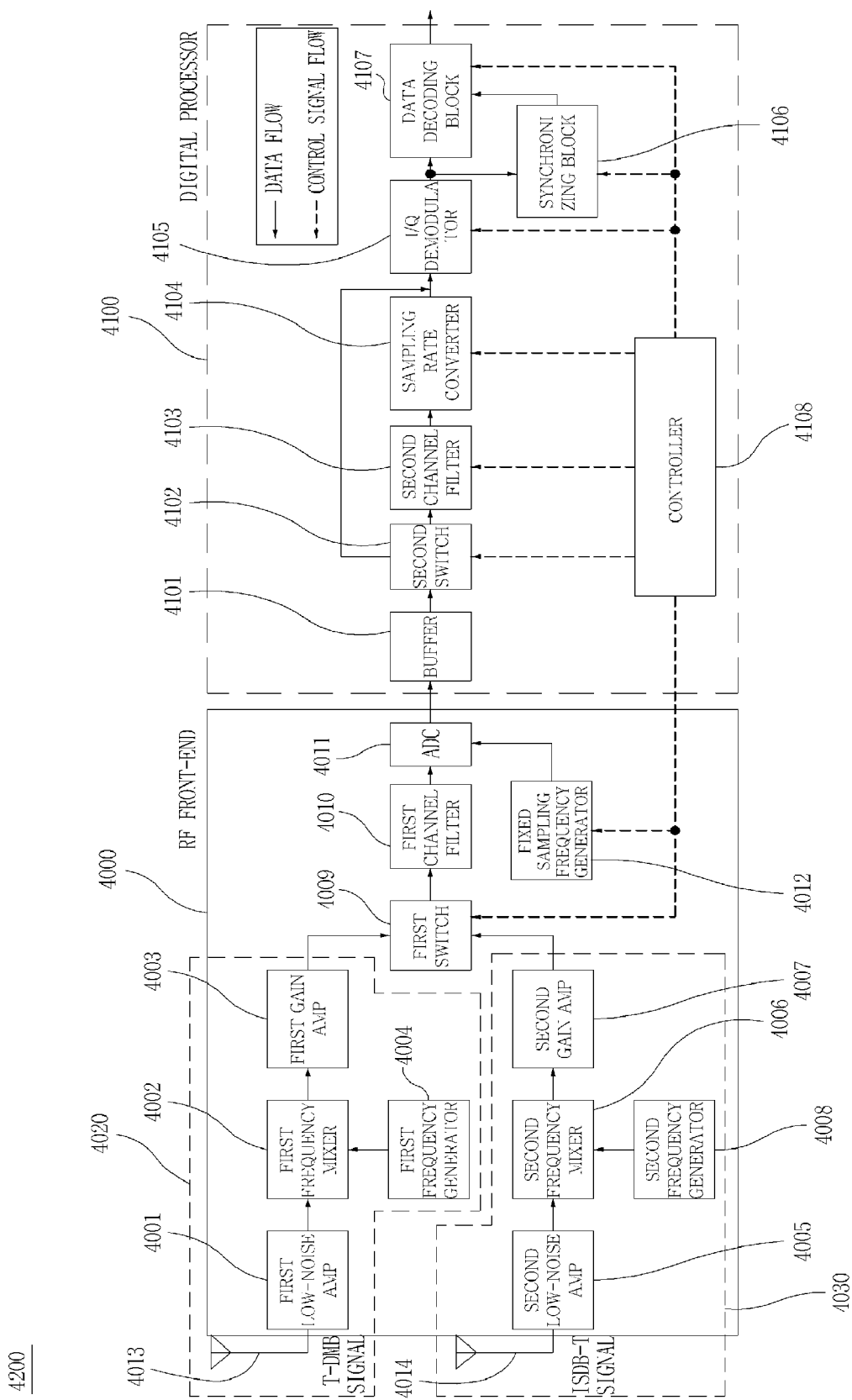
FIG. 4 is a block diagram illustrating an RF receiver in accordance with an embodiment of the present invention.

FIG. 4 is a block diagram illustrating an RF receiver 4200 in accordance with an embodiment of the present invention.

Referring to FIG. 4, the RF receiver 4200 of the present invention includes an RF front-end 4000 and a digital processor 4100.

The RF front-end 4000 is connected to a digital processor 4100, and includes first and second RF tuners 4020 and 4030, a first switch 4009, a first channel filter 4010, an ADC 4011, and a fixed sampling frequency generator 4012.

The first RF tuner 4020 includes a first antenna 4013, a first low-noise amplifier 4001, a first frequency mixer 4002, a first frequency generator 4004, and a first gain amplifier 4003.

The first antenna 4013 receives a T-DMB signal. The first low-noise amplifier 4001 amplifies a magnitude of the received T-DMB signal, reduces noise generated in the amplification process, and transfers the amplified T-DMB signal to the first frequency mixer 4002. The first frequency mixer 4002 converts the amplified T-DMB signal output from the first low-noise amplifier 4001 into an intermediate frequency band, and transfers it to the first gain amplifier 4003. The first frequency generator 4004 generates a frequency signal for converting the amplified T-DMB signal output from the first low-noise amplifier 4001 into an intermediate frequency band, and provides the frequency signal to the first frequency mixer 4002. The gain amplifier 4003 amplifies a gain of an output signal of the first frequency mixer 4002, and transfers the amplified signal to the first switch 4009.

The second RF tuner 4030 includes a second antenna 4014, a second low-noise amplifier 4005, a second frequency mixer 4006, a second frequency generator 4008, and a second gain amplifier 4007. Respective structural elements of the second RF tuner 4030 have substantially the same functions as those of the first RF tuner 4020.

The first switch 4009 selects a desired one of the T-DMB signal received by the first antenna 4013 and the ISDB-T signal received by the second antenna 4014, and transfers the selected one signal to the channel filter 4010. The selection of a desired signal to be received can be achieved according to the control signal output from the controller 4108 included in the digital processor 4100 or set as an initial value in the first switch 4009.

The first channel filter 4010 eliminates interference signals included in the output signal of the first switch 4009, and passes and transfers a signal of a transmission band to the ADC 4011. The first channel filter 4010 has a pass band according to a transmission bandwidth of the T-DMB signal with a wide transmission bandwidth.

The ADC 4011 converts a signal output from the first channel filter 4010 into a digital signal, and transfers the digital signal to the digital processor 4100. A sampling frequency required in this procedure is generated by a fixed sampling frequency generator 4012, and is transferred to the ADC 4011. The generated sampling frequency may be determined according to the control signal output from the controller 4108 included in the digital processor 4100, or set as an initial value in the fixed sampling frequency generator 4012.

Since the T-DMB signal and the ISDB-T signal being a conversion target have different transmission bandwidths, they need sampling frequencies based on their transmission bandwidths when respective signals are converted into digital signals. However, the fixed sampling frequency generator 4012 of the present invention generates a sampling frequency based on a transmission bandwidth of the T-DMB signal with a wide transmission bandwidth regardless of what is a signal selected by the first switch 4009, and transfers the generated sampling frequency to the ADC 4011.

In the conventional dual channel broadcasting receiver 1200 shown in FIG. 1, the RF front-end 1000 includes two channel filters 1004 and 1009. The channel filters 1004 and 1009 have different pass bands according to transmission bandwidths of received signals, respectively. Meanwhile, the RF front-end 4000 of the present invention includes one channel filter 4010. The first channel filter 4010 has a pass band according to a transmission bandwidth of the T-DMB signal with a wide transmission bandwidth. When the signal selected by the first switch 4009 is the ISDB-T signal, because a pass band of the first channel filter 4010 is wider than a transmission bandwidth of the ISDB-T signal, there still remain interference signals around the transmission bandwidth in the signal passed through the first channel filter 4010.

Further, the RF front-end 1000 shown in FIG. 1 includes a variable sampling frequency generator 1013. In the meantime, the RF front-end 4000 of the present invention includes a fixed sampling frequency generator 4012. If the signal selected by the first switch 4009 is the ISDB-T signal, the ISDB-T signal is sampled with the sampling frequency based on a transmission bandwidth of the T-DMB signal wider than that of the ISDB-T signal. Consequently, the quality of the signal sampled based on the transmission bandwidth of the T-DMB signal is lower as compared with that of a signal sampled with the sampling frequency based on the transmission bandwidth of the ISDB-T signal.

The digital processor 4100 is connected to the RF front-end 4000, and includes a buffer 4101, a second switch 4102, a second channel filter 4103, a sampling rate converter 4104, an I/Q demodulator 4105, a synchronizing block 4106, a data decoding block 4107, and a controller 4108.

The buffer 4101 stores and transfers the digital signal output from the RF front-end 4000 to the second switch 4102.

The second switch 4102 controls a path of a signal according to the size of a transmission bandwidth of the digital signal output from the buffer 4101. The path of the signal is determined by comparing the transmission bandwidth of the digital signal with a transmission bandwidth set by the controller 4108. In the embodiment shown in FIG. 4, the set transmission bandwidth becomes a transmission bandwidth of the T-DMB signal with a wide transmission bandwidth. Namely, when the signal output from the buffer 4101 is the T-DMB signal with a transmission bandwidth wider than that of the ISDB-T signal, the second switch 4102 transfers the T-DMB signal to the I/Q demodulator 4105 without passing through the second channel filter 4103 and the sampling rate converter 4104. On the contrary, when the output signal of the buffer 4101 is the ISDB-T signal, the second switch 4102 transfers the ISDB-T signal to the second channel filter 4103.

The second channel filter 4103 is a software based filter included in the digital processor 4100. The channel filter 4103 eliminates interference signals included in the output signal of the second switch 4102, and passes and transfers a signal of a transmission band to the sampling rate converter 4104.

Because a transmission bandwidth of the ISDB-signal is narrower than that of the T-DMB signal, although the ISDB-T signal passes through the first channel filter 4010 of the RF front-end 4000, there remain interference signals around the transmission bandwidth of the ISDB-T signal. Accordingly, when the ISDB-T signal passes through the second channel filter 4103 included in the digital processor 4100, in which a pass band of the second channel filter 4103 is determined based on a transmission bandwidth of the ISDB-T signal, the interference signals remaining around the transmission bandwidth are eliminated.

Since the T-DMB signal previously passed through the first channel filter 4010 based on its transmission bandwidth in the RF front-end 4000, it is unnecessary to pass the T-DMB signal through the second channel filter 4103 of the digital processor 4100. Accordingly, when a signal input to the second switch 4102 is the T-DMB signal, the second switch 4102 controls a path of the T-DMB signal without passing through the second channel filter 4103.

The sampling rate converter 4104 converts a sampling frequency of the signal output from the second channel filter 4103 into a sampling frequency based on a transmission bandwidth of the ISDB-T signal, and transfers the signal with the converted sampling frequency to the I/Q demodulator 4105.

The I/Q demodulator 4105 receives one of the ISDB-T signal output from the sampling rate converter 4104 and the T-DMB signal output from the second switch 4102 as an input, divides the received signal into an in-phase component and a quadrature-phase component, and transfers the in-phase component and the quadrature-phase component to the synchronizing block 4106 and the data decoding block 4107.

The synchronizing block 4106 receives the signal output from the I/Q demodulator 4105, and transfers a control signal for adjusting time and frequency synchronization of the received signal to the data decoding block 4107.

The data decoding block 4107 adjusts time and frequency synchronization of the signal transferred from the I/Q demodulator 4105 according to the control signal from the synchronizing block 4106, and decodes the received signal.

The controller 4108 controls the first switch 4009, the fixed sampling frequency generator 4012, the second switch 4102, the second channel filter 4103, the sampling rate converter 4104, the I/Q demodulator 4105, the synchronizing block 4106, and the data decoding block 4107. That is, the controller 4108 sets parameters required to receive the two signals with different transmission bandwidths in the RF receiver and to perform a series of the foregoing procedures, and controls respective function blocks 4009, 4012, 4103, 4104, 4105, 4106, and 4107.

However, in one embodiment of the present invention, by carrying out filtering and sampling of the ISDB-T signal with a narrow transmission bandwidth through a residual calculation capacity of the digital processor 4100 not the RF front-end 4000, a construction of the RF front-end 4000 may be simplified and manufacturing costs may be reduced while maintaining performance of the RF receiver.

Signal Processing Method Using a Multi-Channel Signal RF Receiver

Figure 5:
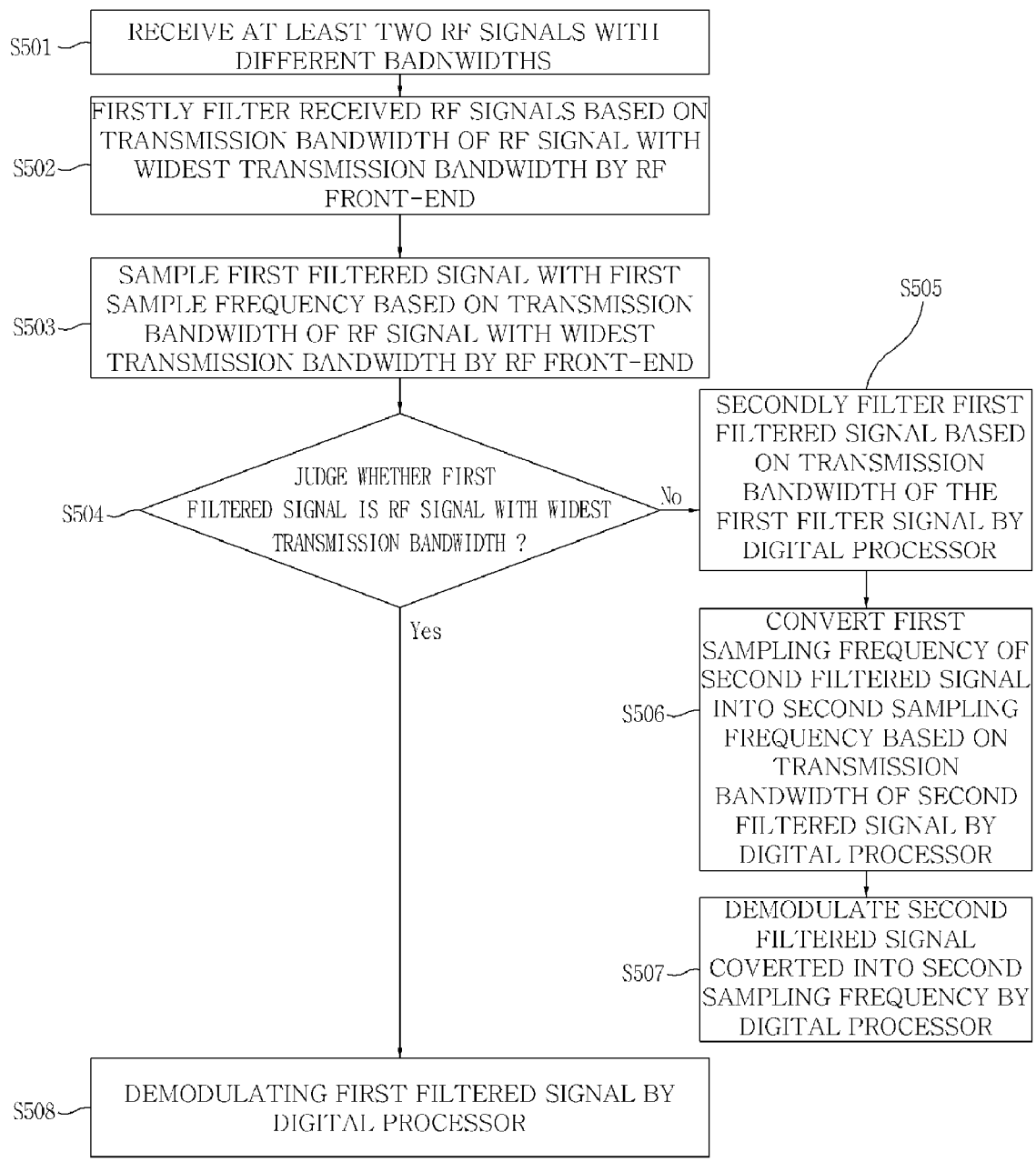
FIG. 5 is a flow chart illustrating a signal processing method using an RF receiver receiving multi-channel signals with different bandwidths in accordance with an embodiment of the present invention.

FIG. 5 is a flow chart illustrating a signal processing method using an RF receiver receiving multi-channel signals with different bandwidths in accordance with an embodiment of the present invention.

First, an RF front-end receives at least two RF signals with different transmission bandwidths (S501).

The RF front-end firstly filters the received RF signals based on a transmission bandwidth of an RF signal having the widest transmission bandwidth among receivable signals to generate a first filtered signal (S502).

The RF front-end samples the first filtered signal with a first sampling frequency based on the transmission bandwidth of the RF signal having the widest transmission bandwidth among the receivable signals (S503).

Next, it is judged whether or not the first filtered signal is an RF signal with the widest transmission bandwidth (S504).

When the first filtered signal is not the RF signal with the widest transmission bandwidth, a digital processor connected to the RF front-end secondly filters the first filtered signal output from the RF front-end based on a transmission bandwidth of the first filtered signal (S505).

Then, the digital processor converts a first sampling frequency of the second filtered signal into a second sampling frequency based on the transmission bandwidth of the second filtered signal (S506).

Subsequently, the digital processor demodulates the second filtered signal converted into the second sampling frequency (S507).

As a result of step S504, when the first filtered signal is the RF signal with the widest transmission bandwidth, the digital processor demodulates the first filtered signal (S508).

Figure 6:
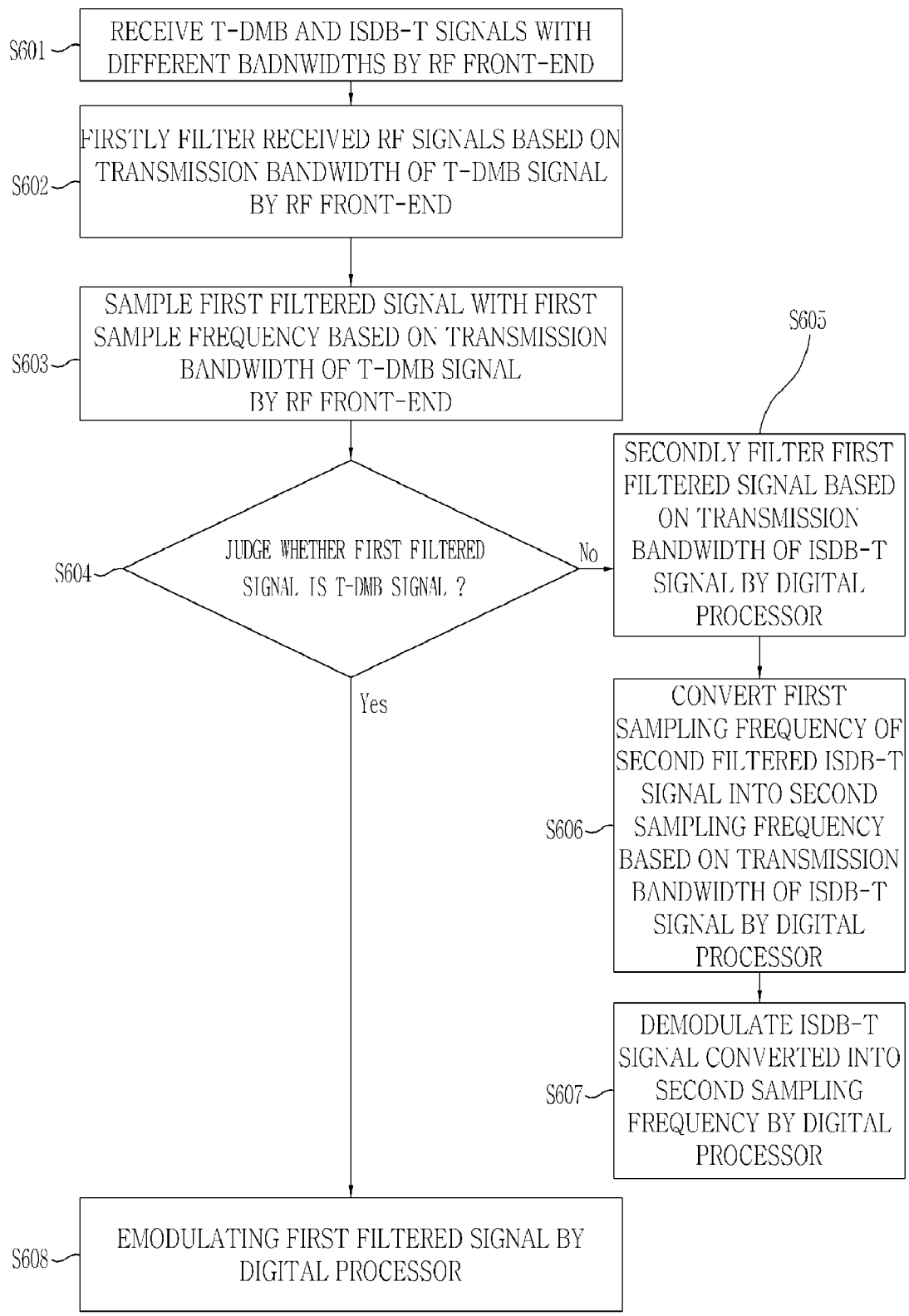
FIG. 6 is a flow chart illustrating a signal processing method using a multi-channel signal RF receiver receiving a T-DMB signal and an ISDB-T signal with different bandwidths in accordance with an embodiment of the present invention.

FIG. 6 is a flow chart illustrating a signal processing method using a multi-channel signal RF receiver receiving a T-DMB signal and an ISDB-T signal with different bandwidths in accordance with an embodiment of the present invention.

First, an RF front-end receives a T-DMB signal and an ISDB-T signal with different transmission bandwidths (S601).

The RF front-end firstly filters the received RF signals based on a transmission bandwidth of the T-DMB signal to generate a first filtered signal (S602).

The RF front-end samples the first filtered signal with a first sampling frequency based on the transmission bandwidth of the T-DMB signal (S603).

Next, it is judged whether or not the first filtered signal is the T-DMB signal (S604).

When the first filtered signal is not the T-DMB signal, a digital processor connected to the RF front-end secondly filters the first filtered signal output from the RF front-end based on a transmission bandwidth of the ISDB-T signal (S605).

Then, the digital processor converts a first sampling frequency of the second filtered ISDB-T signal into a second sampling frequency based on the transmission bandwidth of the ISDB-T signal (S606).

Subsequently, the digital processor demodulates the ISDB-T signal converted into the second sampling frequency (S607).

As a result of step S604, when the first filtered signal is the T-DMB signal, the digital processor demodulates the first filtered signal, namely, the T-DMB signal (S608).

Although embodiments in accordance with the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claim.

What is claimed is:

1. A radio frequency (RF) front-end in an RF receiver receiving at least two RF signals with different transmission bandwidths, comprising:
   at least two RF tuners receiving, amplifying, and frequency-converting the at least two RF signals, respectively;
   a switch selecting one of signals output from the at least two RF tuners;
   a channel filter eliminating interference signals included in a signal output from the switch, and outputting a signal of a transmission band; and
   an analog to digital converter converting the signal output outputted from the channel filter into a digital signal;
   a fixed sampling frequency generator generating and transferring a fixed sampling frequency to the analog to digital converter,
   wherein each of the RF tuners includes:
   an antenna receiving one of the at least two RF signals;
   a low-noise amplifier amplifying the received RF signal and reducing noise generated in the amplification process;
   a frequency mixer converting the amplified signal output from the low-noise amplifier into an intermediate frequency band;
   a frequency generator generating a frequency signal for converting the amplified RF signal output from the low-noise amplifier into an intermediate frequency band, and providing the generated frequency signal to the frequency mixer; and
   a gain amplifier amplifying an output signal of the frequency mixer,
   wherein the channel filter filters the output signal of the switch based on a transmission bandwidth of a signal with the widest transmission bandwidth among the at least two RF signals, and
   the fixed sampling frequency generator generates the fixed sampling frequency based on the transmission bandwidth of the signal with the widest transmission bandwidth among the at least two RF signals.

2. The RF front-end according to claim 1, wherein the RF receiver receives two RF signals with different transmission bandwidths,
   the two RF signals are a terrestrial digital multimedia broadcasting (T-DMB) signal and a terrestrial integrated services digital broadcasting (ISDB-T) signal,
   the channel filter filters the output signal of the switch based on a transmission bandwidth of the T-DMB signal with a wide transmission bandwidth, and
   the fixed sampling frequency generator generates the fixed sampling frequency based on the transmission bandwidth of the T-DMB signal.

3. A digital processor in an RF receiver receiving at least two RF signals with different transmission bandwidths, the digital processor demodulating a digital signal output from an RF front-end receiving the RF signals and sampling the received RF signals with the digital signal, comprising:
   a buffer storing the digital signal output from the RF front-end;
   a switch controlling a path of the digital signal output from the buffer according to the size of a transmission bandwidth of the digital signal;
   a channel filter eliminating interference signals included in the output signal of the switch, and passing a signal of a transmission band;
   a sampling rate converter converting a sampling frequency of an output signal of the channel filter;
   an I/Q demodulator dividing a signal output from the sampling rate converter into an in-phase component and a quadrature-phase component;
   a synchronizing block transferring a control signal for adjusting time and frequency synchronization of an input signal to a data decoding block;
   a decoding block receiving the control signal from the synchronizing block and an output of the I/Q demodulator, adjusting time and frequency synchronization of the received signal, and decoding the received signal; and
   a controller controlling the switch, the channel filter, the sampling rate converter, the I/Q demodulator, the synchronizing block, and the data decoding block,
   wherein the switch transfers the signal to the I/Q demodulator without passing through the channel filter and the sampling rate converter when the signal output from the buffer has a transmission bandwidth wider than a transmission bandwidth set by the controller, and the switch transfers the digital signal output from the buffer to the channel filter when the signal output from the buffer has a transmission bandwidth narrower than the transmission bandwidth set by the controller,
   the channel filter filters the output signal of the switch based on a transmission bandwidth of the output signal, and
   the sampling rate converter converts a sampling frequency of the signal output from the channel filter into a sampling frequency based on the transmission bandwidth of the output signal of the channel filter.

4. The digital processor according to claim 3, wherein the RF receiver receives two RF signals with different transmission bandwidths,
   the two RF signals are a terrestrial digital multimedia broadcasting (T-DMB) signal and a terrestrial integrated services digital broadcasting (ISDB-T) signal,
   the switch transfers the T-DMB signal to the I/Q demodulator without passing through the channel filter and the sampling rate converter when the digital signal output from the buffer is the T-DMB signal, and the switch transfers the ISDB-T signal to the channel filter when the digital signal output from the buffer is the ISDB-T signal,
   the channel filter filters the output signal of the switch based on a transmission bandwidth of the ISDB-T signal, and the sampling rate converter converts a sampling frequency of the ISDB-T signal output from the channel filter based on a transmission bandwidth of the output ISDB-T signal.

5. An RF receiver receiving at least two RF signals with different transmission bandwidths, comprising:
an RF front-end receiving the RF signals and sampling the received RF signals with a digital signal; and
a digital processor demodulating the digital signal output from an RF front-end,
wherein the RF front-end includes:
at least two RF tuners receiving, amplifying, and frequency-converting the at least two RF signals, respectively;
a first switch selecting one of signals output from the at least two RF tuners;
a first channel filter eliminating interference signals included in a signal output from the first switch, and passing a signal of a transmission band;
an analog to digital converter converting the signal output from the channel filter into a digital signal; and
a fixed sampling frequency generator generating and transferring a fixed sampling frequency to the analog to digital converter,
wherein each of the RF tuners includes:
an antenna receiving the RF signal;
a low-noise amplifier amplifying the received RF signal and reducing noise generated in the amplification process;
a frequency mixer converting the amplified signal output from the low-noise amplifier into an intermediate frequency band;
a frequency generator generating a frequency signal for converting the amplified RF signal output from the low-noise amplifier into an intermediate frequency band, and providing the generated frequency signal to the frequency mixer; and
a gain amplifier amplifying an output signal of the frequency mixer,
wherein the first channel filter filters the output signal of the switch based on a transmission bandwidth of a signal with the widest transmission bandwidth among the at least two RF signals, and
the fixed sampling frequency generator generates the fixed sampling frequency based on the transmission bandwidth of the signal with the widest transmission bandwidth among the at least two RF signals,
wherein the digital processor includes:
a buffer storing the digital signal output from the RF front-end;
a second switch controlling a path of the digital signal output from the buffer according to the size of a transmission bandwidth of the digital signal;
a second channel filter eliminating interference signals included in the output signal of the second switch, and passing a signal of a transmission band;
a sampling rate converter converting a sampling frequency of an output signal of the channel filter; an I/Q demodulator dividing a signal output from the sampling rate converter into an in-phase component and a quadrature-phase component;
a synchronizing block transferring a control signal for adjusting time and frequency synchronization of an input signal to a data decoding block;
a decoding block receiving the control signal from the synchronizing block and an output of the I/Q demodulator, adjusting time and frequency synchronization of the received signal, and decoding the received signal; and
a controller controlling the switch, the channel filter, the sampling rate converter, the I/Q demodulator, the synchronizing block, and the data decoding block,
wherein the second switch transfers the signal to the I/Q demodulator without passing through the second channel filter and the sampling rate converter when the signal output from the buffer has a transmission bandwidth wider than a transmission bandwidth set by the controller, and the second switch transfers the digital signal output from the buffer to the second channel filter when the signal output from the buffer has a transmission bandwidth narrower than the transmission bandwidth set by the controller,
the second channel filter filters the output signal of the second switch based on a transmission bandwidth of the output signal, and
the sampling rate converter converts a sampling frequency of the signal output from the channel filter into a sampling frequency based on the transmission bandwidth of the output signal of the channel filter.

6. The RF receiver according to claim 5, wherein the RF receiver receives two RF signals with different transmission bandwidths,
the two RF signals are a terrestrial digital multimedia broadcasting (T-DMB) signal and a terrestrial integrated services digital broadcasting (ISDB-T) signal,
the first channel filter filters the output signal of the switch based on a transmission bandwidth of the T-DMB signal with a wide transmission bandwidth,
the fixed sampling frequency generator generates the fixed sampling frequency based on the transmission bandwidth of the T-DMB signal,
the second switch transfers the T-DMB signal to the I/Q demodulator without passing through the second channel filter and the sampling rate converter when the digital signal output from the buffer is the T-DMB signal, and the second switch transfers the ISDB-T signal to the second channel filter when the digital signal output from the buffer is the ISDB-T signal,
the second channel filter filters the output signal of the second switch based on a transmission bandwidth of the ISDB-T signal, and
the sampling rate converter converts a sampling frequency of the ISDB-T signal output from the second channel filter based on a transmission bandwidth of the output ISDB-T signal.

* * * * *